(No Model.)
M. H. DEVORE.
JOURNAL BEARING FOR RAILROAD AXLES.
No. 449,109. Patented Mar. 31, 1891.
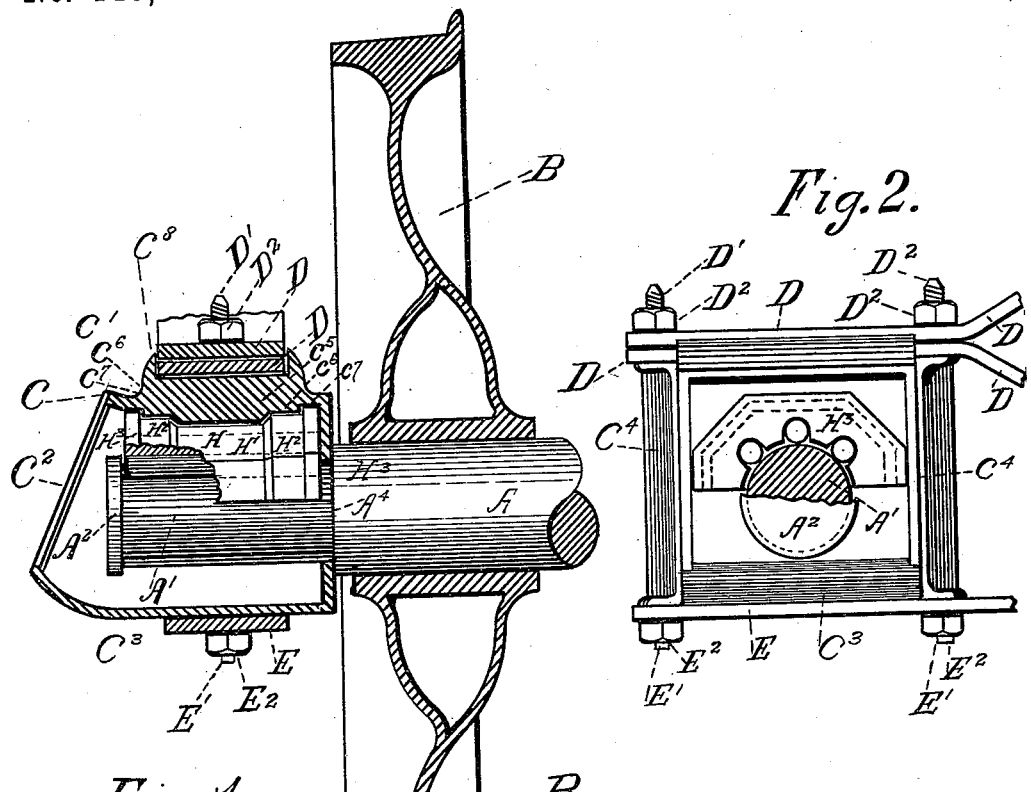
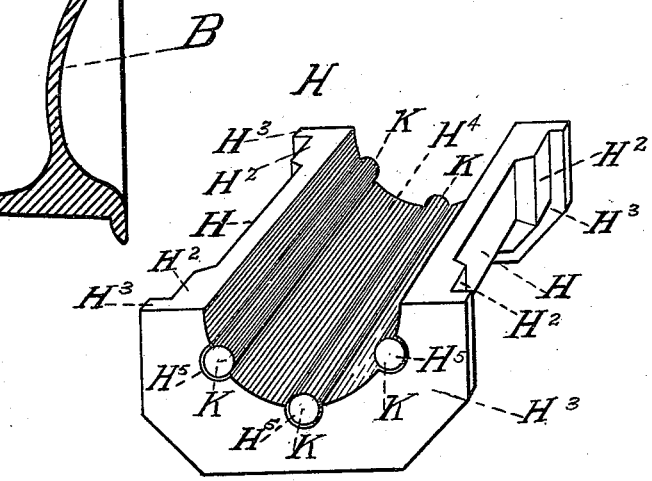
WITNESSES:
Gideon C. Wilson
K. Smith.
INVENTOR
Morris H. Devore
BY
Wm. Hubbell Fisher,
ATTORNEY.

UNITED STATES PATENT OFFICE.

MORRIS H. DEVORE, OF BIRMINGHAM, ALABAMA, ASSIGNOR OF TWO-THIRDS TO PETER G. FISHER AND THOMAS F. RIDER, BOTH OF SAME PLACE.

JOURNAL-BEARING FOR RAILROAD-AXLES.

SPECIFICATION forming part of Letters Patent No. 449,109, dated March 31, 1891.

Application filed April 25, 1890. Serial No. 350,225. (No model.)

*To all whom it may concern:*

Be it known that I, MORRIS H. DEVORE, a citizen of the United States of America, and a resident of the city of Birmingham, in the county of Jefferson and State of Alabama, have invented certain new and useful Improvements in Journal-Bearings for Railroad-Axles, of which the following is a specification.

The several features of my invention and the various advantages arising from their use conjointly or otherwise will be apparent from the following description and claims.

In the accompanying drawings, making a part of this specification, and to which reference is hereby made, Figure 1 is a vertical central section of a car-wheel and axle journal-box, and showing in elevation the end portion of the axle (including the adjacent journal of the latter) and a part of the journal-bearing, a portion of the journal-bearing having been broken away, and a part being shown in section to better illustrate the construction of the said bearing and the relative position of it and its friction-roller to the axle-journal. Fig. 2 is a front elevation of the axle-box, the front door being elevated, and showing the end of the journal-bearing, the friction-rollers thereof, and showing the free or outer end of the axle-journal partly in elevation and partly is section. Fig. 3 is a view in perspective of the journal-bearing and its friction-rollers in place therein, the bearing being shown upside down to the better disclose its construction and the location of the friction-rollers therein.

A indicates the axle of any desired length and diameter.

Upon the axle is fixed the car-wheel B of any desired style of structure or material.

Beyond the face of the wheel is located the journal-bearing $A'$. The outer end of this bearing is provided with the annular flange $A^2$, extending radially out beyond the periphery of the main or bearing surface of the journal.

The journal is inclosed in a suitable axle-box C, one convenient style of which is shown. This box has concave bottom or lower portion $C^3$ for the reception of oil and waste, and an upper portion or saddle $C'$. This saddle rests upon the journal-bearing H. Suitable means are present to prevent the saddle from slipping. The preferred means for this purpose consist in making the exterior and surface of the sides and top of the bearing in recesses, substantially as shown—to wit, at the middle portion of the bearing H is the recess $H'$, and at each side of this recess $H'$ is a recess $H^2$ of less depth. Each end of the bearing is provided with a shoulder $H^3$, extending radially beyond the surface of the recess $H^2$. The inner surface of the saddle $C'$ is provided at each end with a recess $C^7$. Each of these recesses $C^7$ receives its adjacent shoulder $H^3$ of the saddle. The saddle also has an interiorly-projecting portion $C^5$, which latter fits into the middle recess $H'$ of the bearing. Between the raised portion $C^5$ and the recess $C^7$ on the rear portion of the saddle is a lesser projection $C^6$, which latter fits the recess $H^2$ on the rear half of the bearing, and between the raised portion $C^5$ and the recess $C^7$ on the front portion of the saddle is a projection $C^6$ of a degree of projection above its adjacent recess $C^7$ similar to the degree of projection of the rear projection $C^6$. The front projection $C^6$ fits the front recess $H^2$ of the bearing. Thus the saddle and the bearing are kept in the same positions in relation to one another. The bearing H fits closely between the front annular shoulder or flange $A^2$ of the journal and the shoulder $A^4$ of the axle at the rear end of the bearing. In this way the bearing H is kept in position on the journal $A'$, and the saddle is kept in position on the bearing. The box being firmly secured to or being one with the saddle is also kept in place.

Upon the top of the box or saddle is a recess $C^8$, which receives the upper braces D D, one of the latter being located directly above the other. These braces D D are bolted to the box by bolts $D'$ and nuts $D^2$, substantially as shown. Below the box a lower brace E is secured to the box by bolts $E'$ and nuts $E^2$. These braces serve to connect together those boxes on the same side of the car, which belong to the journals of wheels belonging to the same truck. Other functions performed by these braces are two well known to here require mention.

The bearing H does not rest directly upon the journal A'. In the inner surface of the bearing are cut or otherwise formed the grooves H⁵. The length or axis of each of these grooves extends parallel to the axis of the journal. In transverse section they are partially circular, and are usually of sufficient depth to describe in cross-section a semicircle. In each of these grooves is a roller K, round in cross-section and fitting its groove closely, but sufficiently loose to allow of its being readily rotated therein. The number of these rollers and their respective grooves in the bearing may be increased at pleasure. In the drawings I have shown three of said rollers K and their respective receiving-grooves H⁵. These rollers rest upon the journal A', and the bearing H rests upon the rollers. As the journal rotates, the rollers are turned in a contrary direction, and, being well oiled, slip within their respective grooves with a minimum degree of friction. The friction of these rollers on the bearing is much less than that of the bearing would be if the rollers were not present. The oil and waste present in the box C contribute to oil the rollers and their bearings in the bearing C, and also to oil the journal in the usual manner.

The rollers constitute efficient anti-friction devices and reduce the friction between the journals of the wheels and the journal-bearings. Thus the amount of power required to draw the car is diminished. Higher speed can also be obtained when desired. The wear of the journal and bearing is diminished, and consequently the duration of these portions of the running-gear is extended.

What I claim as new and of my invention, and desire to secure by Letters Patent, is—

1. The car-axle box and bearing and journal and anti-friction rollers, the journal being provided with the shoulder $A^2$, the bearing provided with grooves $H^5$, in which the respective rollers K are respectively located, the rollers being of the same length as the bearing, a portion of the bearing and the rollers fitting snugly between the said shoulder $A^2$ of the journal and the rear end or wall of the box, the rollers being interposed between the bearing and the journal, substantially as and for the purposes specified.

2. The axle-box, journal A', having abutting shoulders $A^2$, bearing H, having grooves $H^5$ in its interior surface, rollers K, interposed between the journal and bearing, each of said grooves receiving one of said rollers, the upper portion of said bearing and the under surface of the saddle having corresponding interfitting elevations and depressions, the bearing H and rollers K being located between the front shoulder or flange $A^2$ and a rear abutment, substantially as and for the purposes specified.

3. The axle-box, journal A', having abutting shoulders $A^2$, bearing H, having grooves $H^5$ in its interior surface, rollers K, interposed between the journal and bearing, each of said grooves receiving one of said rollers, the said bearing having end shoulders or flanges $H^3$, depressions $H^2$, located between said flanges $H^3$ and central depressions H', and saddle C, having end depressions $C^7$ and central elevation $C^5$ and elevation $C^6$, respectively located at the respective sides of the elevation $C^5$ and inside of the depressions $C^7$, the elevation $C^5$ entering the depression H' of the bearing, and the elevations $C^6$ respectively entering the respective depressions $H^2$, and the elevations $H^3$ respectively entering the respective depressions $C^7$, and oil-box $C^3$, substantially as and for the purposes specified.

MORRIS H. DEVORE.

Attest:
JAS. B. COLEMAN,
A. A. COLEMAN.